United States Patent
Liu et al.

(10) Patent No.: US 9,164,236 B2
(45) Date of Patent: Oct. 20, 2015

(54) METHODS AND SYSTEMS FOR DELAYING OPTICAL WAVES

(75) Inventors: Hsi-Chun Liu, Pasadena, CA (US); Amnon Yariv, Pasadena, CA (US)

(73) Assignee: CALIFORNIA INSTITUTE OF TECHNOLOGY, Pasadena, CA (US)

(*) Notice: Subject to any disclaimer, the term of this patent is extended or adjusted under 35 U.S.C. 154(b) by 523 days.

(21) Appl. No.: 13/460,638

(22) Filed: Apr. 30, 2012

(65) Prior Publication Data
US 2014/0029893 A1    Jan. 30, 2014

Related U.S. Application Data

(60) Provisional application No. 61/481,614, filed on May 2, 2011.

(51) Int. Cl.
- *G02B 6/26* (2006.01)
- *G02B 6/28* (2006.01)
- *G02B 6/293* (2006.01)
- *G02B 6/35* (2006.01)

(52) U.S. Cl.
CPC .............. *G02B 6/262* (2013.01); *G02B 6/2861* (2013.01); *G02B 6/29343* (2013.01); *G02B 6/26* (2013.01); *G02B 6/29338* (2013.01); *G02B 6/29383* (2013.01); *G02B 6/3596* (2013.01)

(58) Field of Classification Search
CPC .. G02B 6/26; G02B 6/29338; G02B 6/29343; G02B 6/29383; G02B 6/3596
USPC .......... 385/14–15, 27–28, 30, 1, 50; 356/445, 356/450, 459, 460, 471; 359/346
See application file for complete search history.

(56) References Cited

U.S. PATENT DOCUMENTS

| | | | | |
|---|---|---|---|---|
| 8,081,852 B2* | 12/2011 | Tobing et al. | | 385/50 |
| 2005/0053375 A1* | 3/2005 | Yoo et al. | | 398/53 |
| 2006/0159392 A1* | 7/2006 | Popovic | | 385/27 |
| 2006/0239614 A1* | 10/2006 | Montgomery et al. | | 385/39 |
| 2008/0166095 A1* | 7/2008 | Popovic et al. | | 385/126 |
| 2009/0290835 A1* | 11/2009 | Popovic | | 385/32 |
| 2010/0183259 A1* | 7/2010 | Tobing et al. | | 385/39 |
| 2012/0308181 A1* | 12/2012 | Hafezi et al. | | 385/31 |

OTHER PUBLICATIONS

Liu, H., et al., Grating induced transparency (GIT) and the dark mode in optical waveguides, Opt. Express 2009, 17: 11710-11718.
Janner, D., et al., Slow light in periodic superstructure Bragg gratings, Phys. Rev. E 2005, 72: 056605.
Li, J., et al., Systematic design of flat band slow light in photonic crystal waveguides Opt. Express 2008, 16: 6227-6232.
Yariv, A., et al., Coupled-resonator optical waveguide: a proposal and analysis, Opt. Letters 1999, 24: 711-713.
Van, V. Circuit-Based Method for Synthesizing Serially Coupled Microring FiltersJ. Lightwave Technol. 2006, 24: 2912-2919.
Liu, H., et al., Synthesis of high-order bandpass filters based on coupled-resonator optical waveguides (CROWs), Opt. Express 2011, 19: 17653-17688.
Orta, R., et al. Synthesis of Multiple-Ring-Resonator Filters for Optical Systems, IEEE Photon. Technol. Letters 1995, 7: 1447-1449.
Melloni, A., et al., Continuously tunable 1 byte delay in coupled-resonator optical waveguides, Opt. Letters 2008, 33: 2389-2391.
Liu, H., et al., "Ideal" optical delay lines based on tailored-coupling and reflecting, coupled-resonator optical waveguides, Optics Letters 2012, posted Feb. 13, 2012, 1-4.

* cited by examiner

*Primary Examiner* — Ryan Lepisto
*Assistant Examiner* — Guy Anderson
(74) *Attorney, Agent, or Firm* — Steinfl & Bruno LLP (57) ABSTRACT

Coupled-resonator optical waveguides (CROW) can be used to control a speed of an optical signal. In particular, the coupling distance between the resonators can be adjusted to precisely control a group delay of an optical wave. Systems and methods are described to control such coupling distance in a CROW.

13 Claims, 11 Drawing Sheets

METHODS AND SYSTEMS FOR DELAYING OPTICAL WAVES

CROSS REFERENCE TO RELATED APPLICATIONS

The present application claims priority to U.S. Provisional Application No. 61/481,614, filed on May 2, 2011 which is incorporated herein by reference in its entirety.

STATEMENT OF GOVERNMENT GRANT

This invention was made with government support under Grant No. 0925389 awarded by the National Science Foundation, and Grant No. W911NF-10-1-0103 awarded by the Army Research Office. The government has certain rights in the invention.

FIELD

The present disclosure relates to controlling optical signals using couple resonators. In particular, it relates to methods and system for delaying optical waves.

BACKGROUND

Optical delay lines and buffers are key components for optical networks and information processing systems. Delay lines based on conventional optical waveguides can be very long. The length can be greatly reduced if the group velocity of light is significantly reduced. "Slow light" can be achieved in engineered structures which bounce light back and forth as it propagates. Such structures can include grating structures as described in more details in references [1], [2], photonic crystal waveguides as described in reference [3], and coupled-resonator optical waveguide (CROW) as described in reference [4]. A major problem in designing delay lines based on such waveguides is the higher-order dispersion, which can cause a distortion of signal. Although the second-order dispersion of grating structures and CROW is zero at the band center, the group velocity can approach zero at frequencies close to the band edges (see references [1], [2], [4].

Two mechanisms have been proposed and used in the past for optical waveguiding. The most widely used is waveguiding by total internal reflection. Another mechanism is the Bragg waveguiding, in which waveguiding is achieved through Bragg reflection from a periodic structure, has also been demonstrated.

SUMMARY

According to a first aspect, a method for providing an optical signal with a substantially constant delay along a frequency spectrum while maintaining a substantially constant amplitude of the optical signal is described, the method comprising: providing coupled resonator optical waveguides (CROW) comprising a plurality of resonators; setting a coupling distance between each resonator of the CROW; and propagating the optical signal through the CROW by inputting the optical signal to an input waveguide of the CROW and outputting the optical signal from an output waveguide of the CROW, wherein the input waveguide is the same as the output waveguide.

According to a second aspect, a method for providing an optical signal with a substantially constant delay along a frequency spectrum while maintaining a substantially constant amplitude of the optical signal is described, the method comprising: providing a first optical signal path, the first optical signal path comprising an input portion and an output portion; providing a second optical signal path, the second optical signal path being across coupled resonator optical waveguides (CROW), the CROW comprising a plurality of resonators; optically coupling the first optical signal path with a first resonator of the CROW, the optically coupling being a function of a coupling distance between the first optical signal path and the first resonator; providing an optical signal at the input portion of the first optical signal path; and sequentially propagating the optical signal through the input portion of the first optical signal path, through the second optical signal path, and through the output portion of the first optical signal path.

According to a third aspect, a system for delaying an optical signal is described, the system comprising: a first optical signal path, the first optical signal path being both an input portion for the optical signal and an output portion for the optical signal; and a second optical signal path, the second optical signal path being coupled resonator optical waveguides (CROW), the CROW comprising a plurality of resonators, wherein each resonator of the plurality of resonators is optically coupled with one or more adjacent resonators at a set coupling distance, and wherein the first optical signal path is optically coupled with a first resonator of the plurality of resonators at a set coupling distance, wherein the set coupling distance changes a group velocity of the optical signal in the second optical signal path and the output portion of the first optical signal path.

According to a fourth aspect, a system comprising a plurality of the system according to the third aspect is described, wherein the plurality of the system according to the third aspect is arranged in series such that the delayed optical signal outputted from a first system is adapted to be inputted into a second system.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

DETAILED DESCRIPTION

In some optical systems, it may be desired to control the speed of an optical signal traveling through a waveguide in order to, for example, synchronize optical signals in an optical buffer network. Since the speed of light is extremely fast, a long waveguide can be used for such slowing down (delaying), or a coupled-resonator optical waveguide (CROW) as described in reference [4] can be utilized. A CROW can comprise a chain or an array of coupled resonators where light propagates along the chain or array of resonators by virtue of inter-resonator coupling. Thus, by slowing down the optical signal, the group velocity of the wave that comprises the optical signal can be delayed. The group velocity of a wave is defined herein as the velocity in which the overall modulation (envelope) shape of the wave propagates through space.

Figure 1:
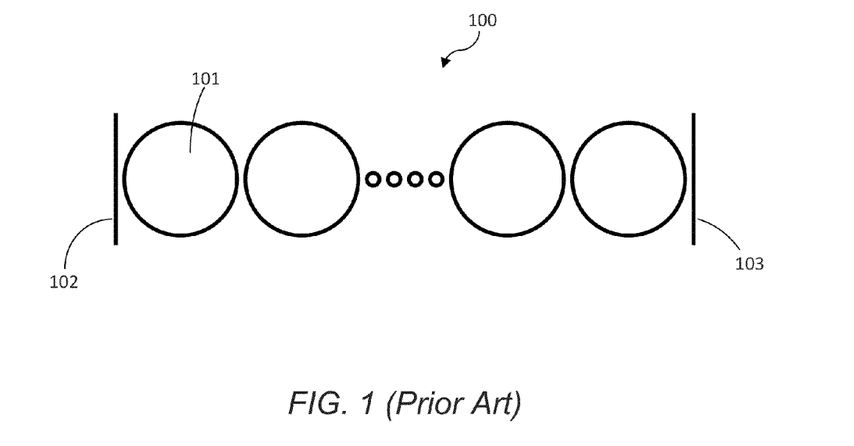
FIG. 1 shows a schematic diagram of a coupled resonator optical waveguide (CROW).
Figure 2:
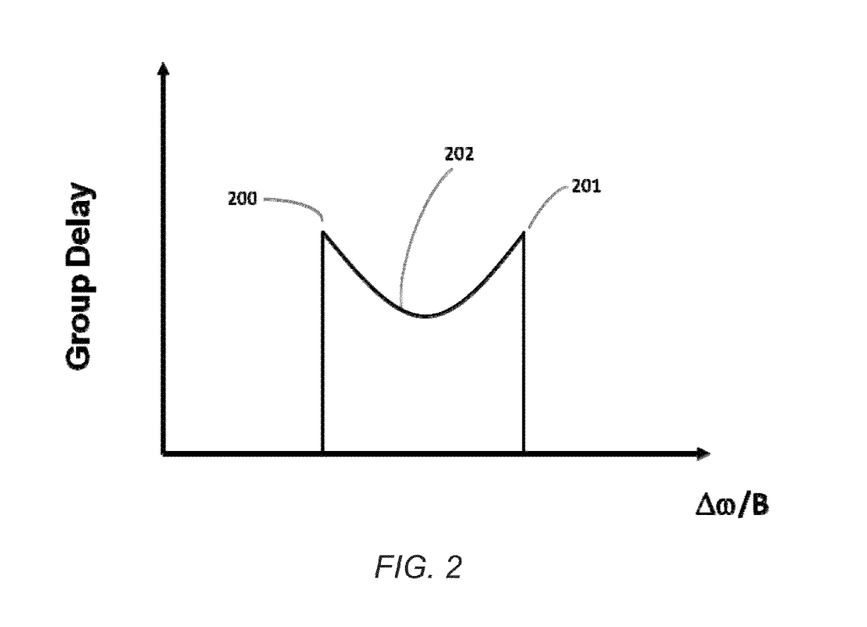
FIG. 2 shows a graphical representation of a group delay vs. optical frequency wherein the group delay varies across the spectra.

FIG. 1 shows an example configuration of a CROW 100 comprising a chain of ring shaped resonators 101 with an optical input line 102 and an optical output line 103. Thus, an optical signal typically propagates in the direction shown by the arrow on the optical input line 102. As the optical signal propagates through the optical input line 102, the optical signal is coupled to the adjacent ring shaped optical resonator 101. Consequently, the optical signal gets coupled from the leftmost resonator (as shown in FIG. 1) all the way to the rightmost resonator, and is ultimately coupled to the optical output line 103, where the optical signal exits the CROW 100 as a delayed optical signal. However, such configuration of the CROW can result in less than ideal group delay spectra as shown in FIG. 2, where the edges of the spectra 200, 201 have a higher group delay, while the group delay in the center of the spectra has a lower group delay. As a result, the output of the optical signal will have varying group delay depending on the frequency of the signal.

According to an embodiment of the present disclosure, a reflecting type CROW is described. In the example reflecting type CROW shown in FIGS. 3A-3C, the optical signal enters and exits the CROW from the same waveguide. In other words, similar to the CROW shown in FIG. 1, an optical signal is coupled to the CROW from the optical input line 300 to the adjacent CROW 301. The optical signal is coupled from the first resonator 301, all the way to the last resonator 304 while slowing down the signal as the optical signal propagates along the chain of resonator. Such optically coupled resonators do not necessarily have to make contact with each other. Differently from the configuration shown in FIG. 1, instead of optical signal exiting the CROW from the last resonator 304, the optical signal is reflected back along the chain of resonators, all the way back to the first resonator 301, where the delayed optical signal is coupled to the optical output line 305, which is the same optical waveguide as the input waveguide.

FIGS. 4A-4D show example microscopic and SEM photographs of a ring shaped CROW made of polymer (e.g., PMMA). However, CROW can be made of other materials such as silica, silicon nitride, polymers, or any other material having transparent optical properties for the wavelength of interest (e.g., silicon may not be transparent for visible light but may be transparent for infrared light). Moreover, CROW is not necessarily limited to ring shaped CROWs, but also disc shaped resonators, sphere shaped resonators, cavities with partially transmitting mirrors, or defects in periodic structures.

The concept of CROW as shown in FIG. 1 and also described in reference [4] was based on a uniform coupling coefficient which leads to a dispersion curve and a group velocity dictated by the coupling coefficient. If the coupling coefficients are allowed to vary along the CROW, the dispersive properties can be further controlled.

Figure 5:
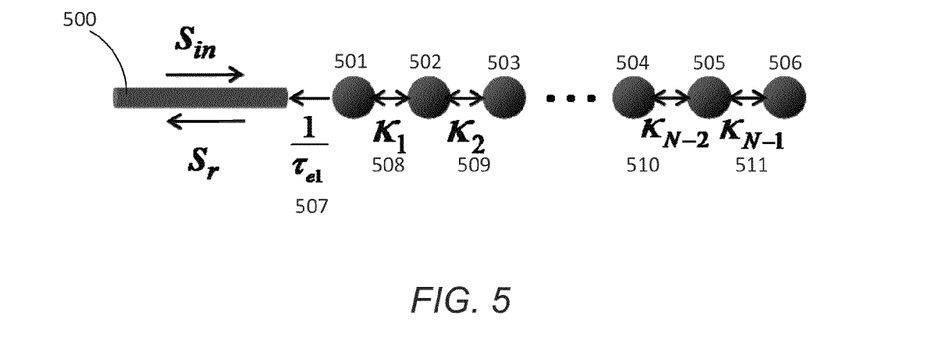
FIG. 5 shows a schematic diagram of a reflecting CROW.

According to another embodiment of the present disclosure, the group velocity of the optical signal can be precisely controlled by adjusting the coupling distance between the chain or array of CROW resonators. FIG. 5 is a schematic view of a CROW showing the coupling coefficients between each of the resonators 501-506, as $\kappa_1$-$\kappa_{N-1}$ 508-511, and the coupling coefficient between the optical input/output waveguide and the first adjacent resonator 501 as $1/\tau_{e1}$.

In the transmission mode, the transfer function T is a function of s, where $s \equiv i(\omega - \omega_0)$ is the frequency detuning from the resonant frequency. Each resonator can be considered as a feedback loop which contributes a pole to the transfer function. An N-resonator CROW can be thought of as an all-pole filter of order N whose transfer function is given by $T(s) = k/p(s)$, where $p(s)$ is a polynomial in s. Filter designs can then be applied to derive the coupling coefficients which determine the transfer function of the CROW to achieve desired filter responses (references [5], [6], [7]). For example, Butterworth CROW exhibits a flat transmission and a Bessel CROW exhibits a group delay. However, it can be difficult to achieve a constant amplitude and group delay by any one of these filters simultaneously, since the amplitude and the phase of all-pole functions are related to each other.

According to an embodiment, an "ideal" optical delay line comprising a constant group delay and a constant amplitude transmission over a prescribed bandwidth can be achieved. It is based on the reflection of a CROW, whose inter-resonator coupling coefficients are tailored to realize an all-pass Bessel filter. The design of all-pass Bessel filters have been explored using microwave equivalent circuit methods [5]. A method for deriving the time-domain coupling coefficients and interpreting the physics behind the idea is described.

Figure 6:
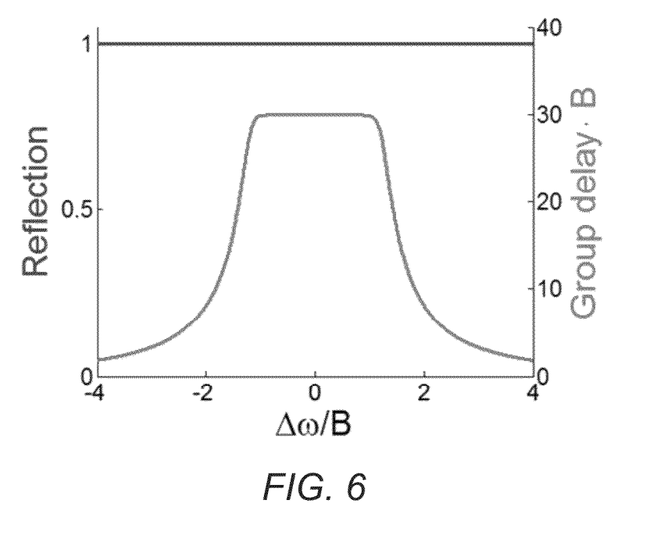
FIG. 6 shows a spectra of reflection and group delay of an N=6 reflecting Bessel CROW.

An all-pass filter function can be written as $[p(s)]^*/p(s)$ to preserves the phase of T(s) and achieve a constant (e.g. maximally flat) group delay output amplitude of 1. Thus, an all-pass Bessel filter whose $p(s)$ is a Bessel polynomial possessing constant amplitude and maximally flat group delay over a prescribed bandwidth, as shown in FIG. 6. The higher-order dispersion is 0 up to an order N. Such all-pass filters can be realized in the reflection mode of lossless CROWs. The input energy coupled into the CROW is eventually coupled back as output into the original waveguide since it is the only exit channel. Although a Bessel filter is used to describe the various embodiments of the present disclosure, other filters can also be used, as know by those skilled in the art.

Figure 3A:
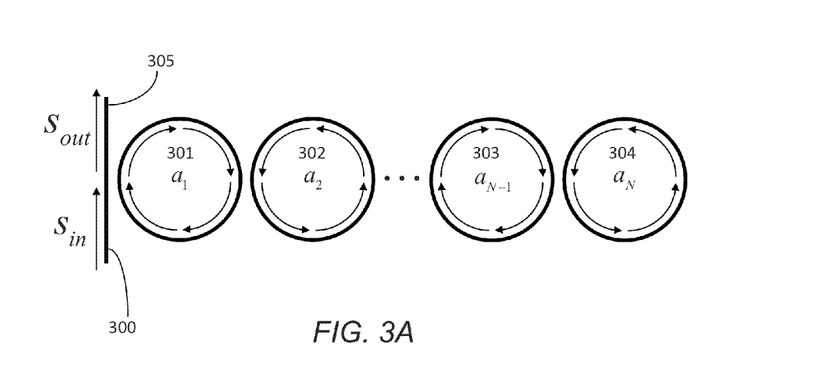
FIGS. 3A-3C show an example reflecting coupled resonator optical waveguide (CROW) according to an embodiment of the present disclosure.
Figure 3B:
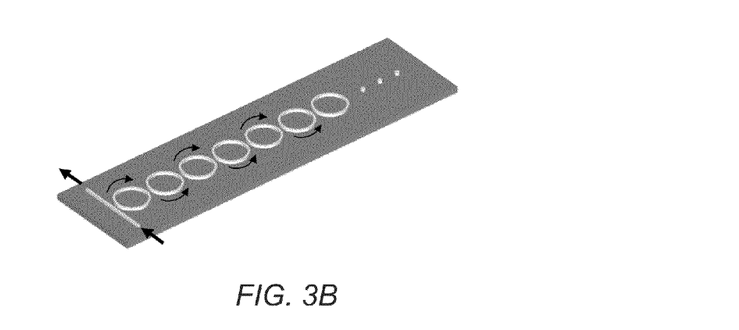
Figure 3C:
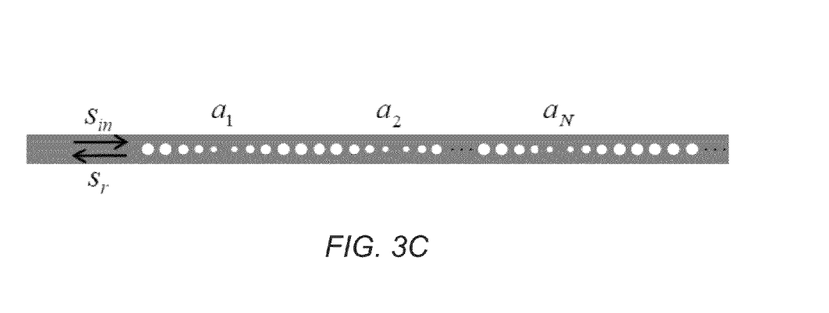
Figure 4A:
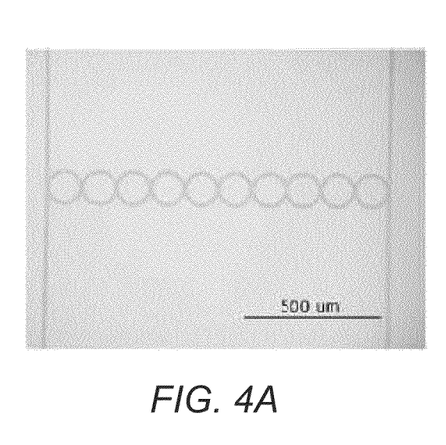
FIGS. 4A-4D show microscopic and SEM photographs of example CROWs.
Figure 4B:
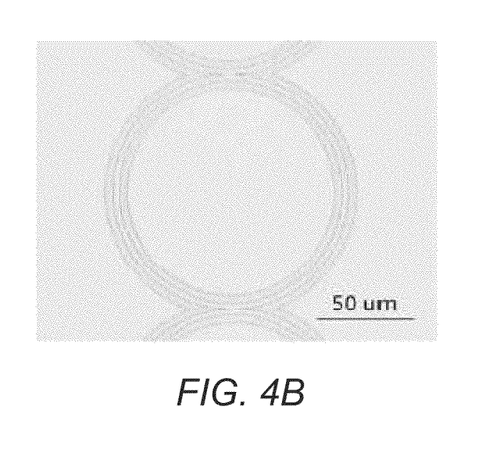
Figure 4C:
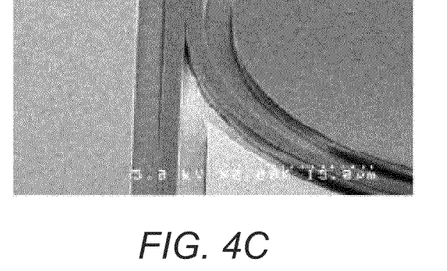
Figure 4D:
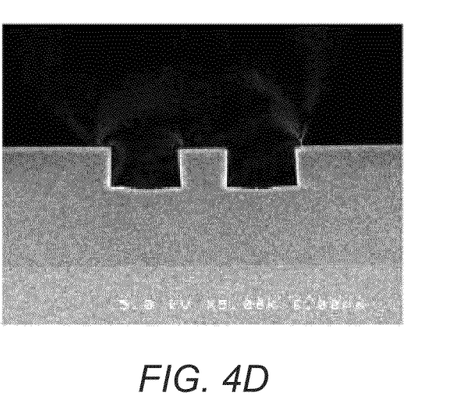

Reflecting CROWs can be realized using various kinds of resonators. FIGS. 3A and 3C illustrate reflecting CROWs based on ring resonators and grating-defect resonators, where the output $s_r$ is at the through port of the microring CROWs and at the reflection of grating CROWs. The coupling coefficients can be controlled via the gap (coupling distance) between ring resonators or the number of holes between adjacent defects. Microring reflecting CROWs have been experimentally demonstrated for the purpose of tunable delay as described in reference [8].

In order to realize ideal delay lines, according to an embodiment of the present disclosure, the coupling coefficients need to be derived. The formalism is based on coupled-mode theory. Consider the CROW as shown in FIG. 5 which comprises of N identical resonators with the first resonator being coupled to an input waveguide. For an input $s_{in}$ at a frequency $\omega$, the steady-state complex mode amplitudes of the resonators, $a_1, a_2, \ldots a_N$, obey the coupled-mode equation, as described in reference [6]:

$$\begin{bmatrix} s+\frac{1}{\tau_{e1}} & i\kappa_1 & 0 & 0 & \ldots & 0 \\ i\kappa_1 & s & i\kappa_2 & 0 & \ldots & 0 \\ 0 & i\kappa_2 & s & \ldots & \ldots & \ldots \\ \ldots & \ldots & \ldots & \ldots & \ldots & \ldots \\ \ldots & \ldots & \ldots & \ldots & s & i\kappa_{N-1} \\ \ldots & \ldots & \ldots & \ldots & i\kappa_{N-1} & s \end{bmatrix} \begin{bmatrix} a_1 \\ a_2 \\ \vdots \\ a_N \end{bmatrix} = \begin{bmatrix} -i\mu_1 s_{in} \\ 0 \\ \vdots \\ 0 \end{bmatrix}, \quad (1)$$

The tri-diagonal coupling matrix, denoted as A, consists of the frequency detuning s in the main diagonal and the time-domain coupling coefficients $i\kappa_i$ in the upper and lower diagonals. The coupling to the input waveguide is modeled by an external loss of the first resonator, $1/\tau_{e1}$, and an input coupling $-i\mu_1 s_{in}$ at the right-hand side of equation (1). It can be shown that $\mu_i = \sqrt{2/\tau_{e1}}$ using conservation of energy.

The reflected amplitude, $s_r$, is given by $s_r = s_{in} - i\mu_r \alpha_1$, where $\alpha_1$ is obtained from equation (1) as $\alpha_1 = [A^{-1}]_{1,1}(-i\mu_1 s_{in})$. The transfer function of reflection can be written as:

$$R(s) = \frac{s_r}{s_{in}} = 1 - \mu_1^2 [A^{-1}]_{1,1} = \frac{p_N - \mu_1^2 p_{N-1}}{p_N}, \quad (2)$$

where $p_k$ for $k=1, 2, \ldots, N$ is defined as the determinant of the bottom-right k×k submatrix of A and is a polynomial in s with a leading term $s^k$. The polynomials $p_1$ through $p_N$ satisfy the recursive formulas [6]:

$$p_N = \left(s + \frac{1}{\tau_{e1}}\right) p_{N-1} + \kappa_1^2 p_{N-2} \quad (3)$$

$$p_{N-1} = s p_{N-2} + \kappa_2^2 p_{N-3}$$

$$\vdots$$

$$p_2 = s p_1 + \kappa_{N-1}^2$$

$$p_1 = s,$$

As an example we consider an all-pass Bessel filter of order N=6, whose transfer function is given by $R(s)=[p(s)]^*/p(s)$, where p(s) is a Bessel polynomial, $p(s)=s^6+4.495s^5+9.622s^4+12.358s^3+9.92s^2+4.672s+1$. The group delay of R(s) is maximally flat between $\Delta\omega=-1$ and 1. Since the coefficients of p(s) are real, $[p(s)]^*=p(-s)$. Comparing R(s) with equation (2), we obtain $p_6=p(s)$ and $\mu_1^2 p_5=p(s)-p(-s)$. Since the leading coefficient of every polynomial $p_k$ is 1, $\mu_1^2=8.990$ and $p_5=s^5+2.749s^3+1.039s$. With $p_6$ and $p_5$, all the coupling coefficients can be extracted step by step, using Equation (3). The extracted coefficients are $(1/\tau_{e1}, \kappa_1, \kappa_2, \kappa_3, \kappa_4, \kappa_5)=$ (4.495, 2.622, 1.207, 0.824, 0.632, 0.463), which decrease monotonically from the input. Finally, the coefficients can be multiplied by a bandwidth parameter B to choose the bandwidth, which leads to maximally flat delay between $\Delta\omega=-B$ and B. The group delay is inversely proportional to B. The spectra of reflection and group delay are shown in FIG. 6.

Figure 7:
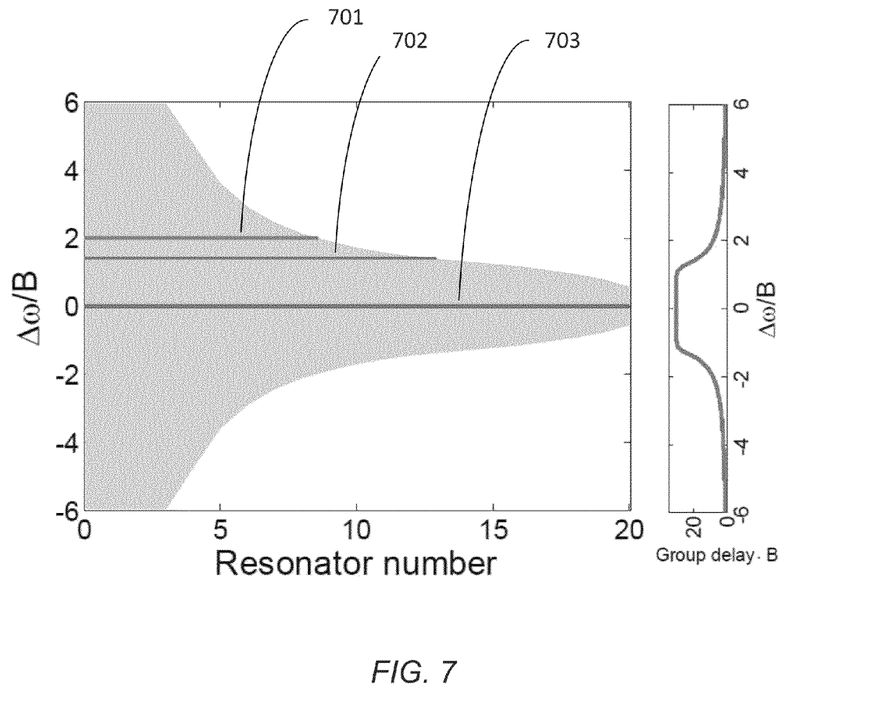
FIG. 7 shows a CROW propagation band as a function of distance of an N=20 reflecting Bessel CROW and a group delay spectrum.

The physics behind reflecting Bessel CROWs can be explained by plotting the CROW propagation band as a function of distance. CROWs with uniform coupling coefficient κ form a constant-height band between $\omega_0-2\kappa$ and $\omega_0+2\kappa$. Frequencies within the CROW band propagate freely while those outside evanesce exponentially with distance. CROWs with tailored coupling coefficients correspond to a distance-dependent CROW band wherein the thickness is 4κ(z), where κ(z) is the local coupling coefficient. FIG. 7 shows the modulated CROW band of an N=20 reflecting Bessel CROW, whose bandwidth decreases monotonically from the input. An input signal at a given frequency propagates into the CROW until it reaches the band edge where it is reflected back. Lines 701-703 in FIG. 7 indicate the propagating distances at $\Delta\omega/B=0$, 1.4, and 2. FIG. 7 plots the field distribution at such frequencies. At $\omega=0$, light propagates to the last resonator (resonator 304 in FIG. 3). As the frequency moves away from the resonant frequency, the propagating distance decreases. The dependence of the propagating distance on frequency compensates for the group velocity dispersion of CROWs, whose group delay increases monotonically from the band center to the band edge, and results in a constant group delay.

Figure 8A:
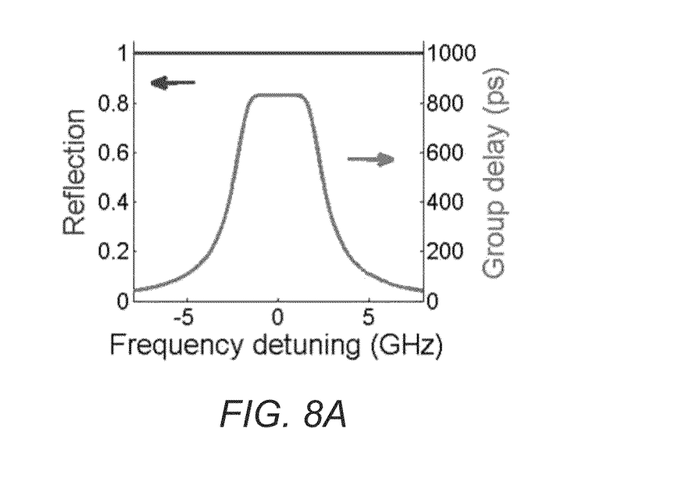
FIGS. 8A-8E show various reflection and group delay responses for different scenarios.
Figure 8B:
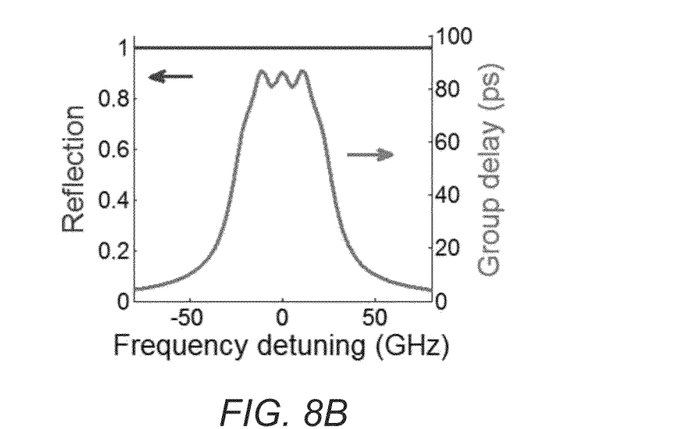

To realize reflecting Bessel CROWs in ring resonators, time-domain coupling coefficients can be converted to field coupling coefficients in the coupling regions. By way of example and not of limitation, silicon ring resonators can be considered. The mode index and group index of the silicon waveguides are respectively 2.4 and 4. The radii of the rings are selected as 20 μm so that one resonant wavelength is 1570.8 nm and the free spectral range $f_{FSR}$ is 597 GHz. The relation between the field coefficient η and the coupling coefficient κ is given by $\eta=\sin(\kappa/f_{FSR})$ for inter-resonator coupling and $\eta_1=\sqrt{2\sin(1/\tau_{e1}f_{FSR})/[1+\sin(1/\tau_{e1}f_{FSR})]}$ at the input. By way of example and not of limitation, $B=\omega_{FSR} \cdot 0.003$ and $B=\omega_{FSR} \cdot 0.03$, which lead to field coupling coefficients of (0.395, 0.0494, 0.0228, 0.0155, 0.0119, 0.0087) and (0.926, 0.474, 0.226, 0.155, 0.119, 0.087), respectively. The spectra of reflection and group delay are shown in FIGS. 8A-8B. The spectra can be ideal for weaker coupling coefficients when $B=\omega_{FSR} \cdot 0.003$. For the case of $B=\omega_{FSR} \cdot 0.03$, there are oscillations in the group delay spectrum since the coupling coefficient at the input is close to the maximal coupling coefficient of the ring resonators, $\omega_{FSR}/4$.

Figure 8C:
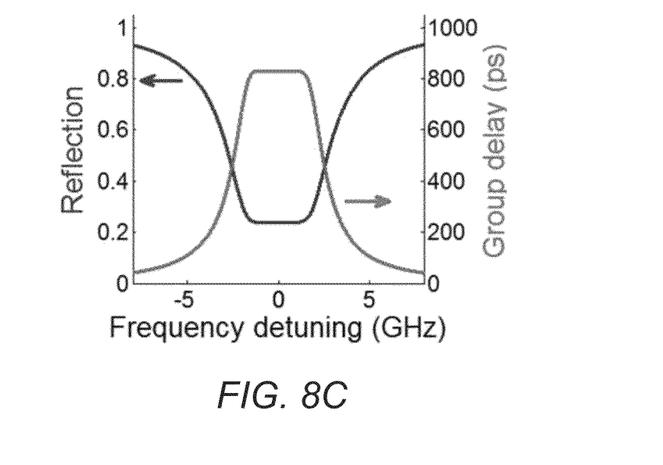
Figure 8D:
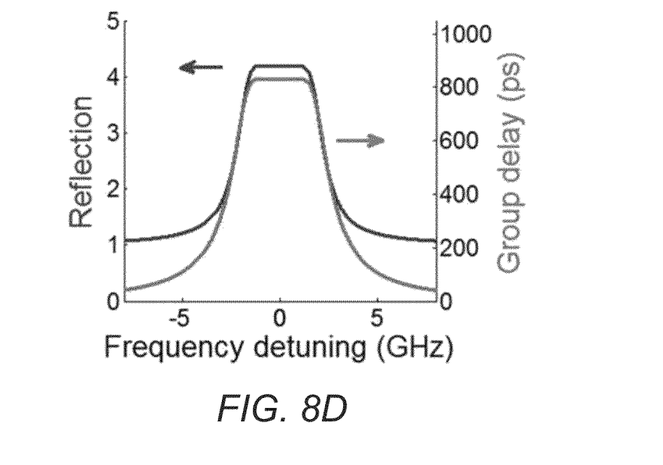

Although lossless resonators were considered up to this point, lossy resonators with contact loss rates can also be considered. In such case with lossy resonators, the total loss is proportional to the group delay. Since the group delay is flat, the loss is also flat within the bandwidth, and the definition of ideal delay lines is still satisfied. FIG. 8C shows the spectra of the same microring CROW as in FIG. 8A with a propagation loss of 1 dB/cm. On the other hand, if the resonators are pumped with uniform gain, the amplification is proportional to the group delay and is also flat, as shown in FIG. 8D. The enhanced reflection gain by slow light results in efficient and dispersion-less amplifiers.

One important parameter of optical delay lines is the delay-bandwidth product (DBP), Δf·τ, which represents the maximum number of bits that can be stored. The DBP of reflecting Bessel CROWs is approximately 0.5 per resonator, as can be evaluated in FIG. 6, 7, or 8A. The upper bounds of DBP per resonator of transmitting CROWs and reflecting CROWs are 0.5 and 1 respectively. The higher DBP of reflecting CROWs is because each resonator in a reflecting CROW contributes not only a pole but also a zero to the transfer function, leading to a total phase shift of 2π over the resonance. Transmitting CROWs with uniform coupling, as an example, possesses a DBP of 1/(2π) per resonator, if the central half the CROW band is considered as the bandwidth. The DBP per resonator of reflecting Bessel CROWs in this work is equal to the upper bound for transmitting CROWs and is thus larger than that of any kind of transmitting CROW.

Figure 8E:
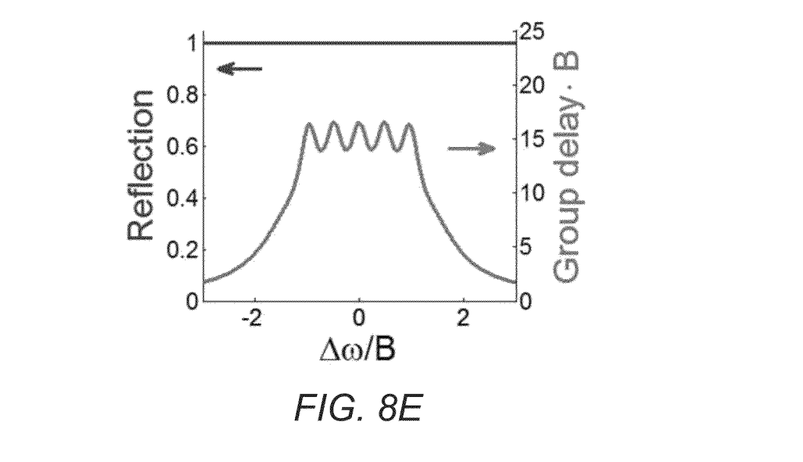
Figure 8F:
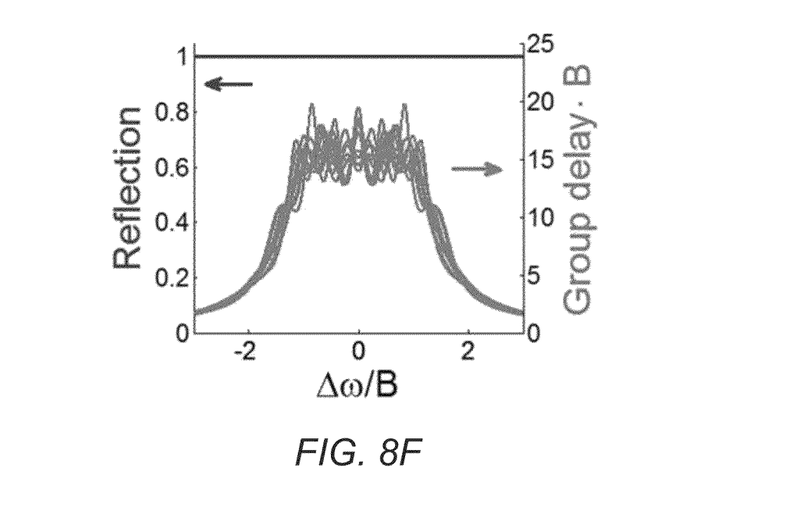

Although the delay capability of reflecting CROWs is larger, reflecting CROWs are more sensitive to fabrication disorder of coupling coefficients and resonant frequencies. Any imperfection in a reflecting CROW scatters light twice as it takes a round trip. The cavity between the imperfection and the end of the CROW causes Fabry-Perot-type oscillations, as shown in FIGS. 8E-8F. shows the spectra of 10 different N=10 reflecting Bessel CROWs under disorder of coupling coefficients. The modified coupling coefficients are given by $\kappa_i'=r_i\kappa_i$, where $r_i$ is a Gaussian-distributed random variable with a standard deviation of 0.03. The effect of disorder in resonant frequencies is similar. Under disorder, the average of the delay spectra is still optimally flat among all kinds of reflecting CROWs.

According to another embodiment, in addition to achieving a constant group delay, the reflecting CROW can be further configured to yield different delay characteristics, by way of example and not of limitation, a group delay that is a linear function of frequency. Such linear delay can be used as a compact dispersion compensator for fiber optics communication systems.

Figure 9:
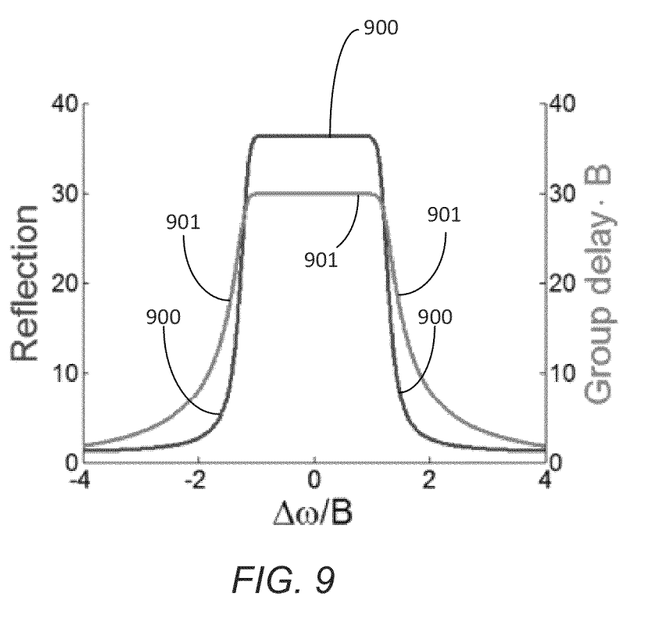
FIG. 9 shows a CROW graphical representation of transmission (reflection) vs. optical frequency, and group delay vs. optical frequency, both in the presence of optical gain.

Furthermore, an optical gain can be electrically or optically pumped into the reflecting CROW in order to amplify the light signal while maintaining the "ideal" delay/filter characteristics, as shown in FIG. 9. For example, by using III-V semiconductor for the CROW, and the CROW can be electrically pumped by applying a current to the CROW, or optically pumped by applying light having particular wavelengths such that the electrons of the III-V semiconductor are excited to a higher state. When the number of electrons in the higher state is greater than the number of electrons in the lower state, the CROW can optically amplify the light signal. Accordingly, the CROW is configured as a compact, efficient amplifier with a gain coefficient enhanced by the large group delay. By way of example and not of limitation, since the CROW in FIGS. 3A-3C have a periodic frequency response (e.g., a constant free spectral range), the CROW can simultaneously delay, compensate, and amplify a plurality of communication channels. Line 901 in FIG. 9 shows the group delay and line 900 shows the transmission amplitude of the reflected, amplified optical signal.

The examples set forth above are provided to give those of ordinary skill in the art a complete disclosure and description of how to make and use the embodiments of the present disclosure, and are not intended to limit the scope of what the inventors regard as their disclosure. Modifications of the above-described modes for carrying out the disclosure may be used by persons of skill in the art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a", "an", and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

LIST OF REFERENCES

[1] H. C. Liu and A. Yariv, Opt. Express 17, 11710-11718 (2009).
[2] D. Janner, G. Galzerano, G. Della Valle, P. Laporta, S. Longhi, and M. Belmonte, Phys. Rev. E 72, 056605 (2005).
[3] J. Li, T. P. White, L. O'Faolain, A. Gomez-Iglesias, and T. F. Krauss, Opt. Express 16, 6227-6232 (2008).
[4] A. Yariv, Y. Xu, R. K. Lee, and A. Scherer, Opt. Lett. 24, 711-713 (1999).
[5] V. Van, "Circuit-based method for synthesizing serially coupled microring filters," J. Lightwave Technol. 24, 2912-2919 (2006).
[6] H. C. Liu and A. Yariv, "Synthesis of high-order bandpass filters based on coupled-resonator optical waveguides (CROWs)," Opt. Express 19, 17653-17668 (2011).
[7] R. Orta, P. Savi, R. Tascone, and D. Trinchero, IEEE Photon. Technol. Lett. 7, 1447-1449 (1995).
[8] A. Melloni, F. Morichetti, C. Ferrari, and M. Martinelli, Opt. Lett. 33, 2389-2391 (2008).

The invention claimed is:

1. A system for delaying an optical signal, the system comprising:
   a first optical signal path, the first optical signal path being both an input portion for the optical signal and an output portion for the optical signal; and
   a second optical signal path, the second optical signal path being coupled resonator optical waveguides (CROW), the CROW comprising a plurality of resonators, wherein each resonator of the plurality of resonators is optically coupled with one or more adjacent resonators at a set coupling distance, and
   wherein the first optical signal path is optically coupled with a first resonator of the plurality of resonators at a set coupling distance,
   wherein the set coupling distance changes a group velocity of the optical signal in the second optical signal path and the output portion of the first optical signal path,
   wherein the plurality of resonators comprises at least three resonators,
   wherein each of the set coupling distances match coupling coefficients according to a desired transfer function, the transfer function describing an output optical signal of the system and wherein the coupling coefficients decrease monotonically from the input portion towards the output portion for the optical signal.

2. The system of claim 1, wherein each set coupling distance is different from each other.

3. The system of claim 1, wherein the CROW is selected from the group consisting of: ring shaped resonators, spherical resonators, defects in periodic structures, and cavities with partially transmitting mirrors.

4. The system of claim 1, wherein the CROW is made with silicon, silica, nitride or polymer.

5. The system of claim 1, wherein the plurality of resonators of the CROW are arranged in a chain or array configuration.

6. The system of claim 1, further comprising an optical amplifier adapted to amplify the optical signal.

7. The system of claim 1, wherein the group velocity at the output portion of the first optical signal path is substantially constant along an entire frequency spectrum.

8. A system comprising a plurality of the system according to claim 1 arranged in series such that the delayed optical signal outputted from a first system is adapted to be inputted into a second system.

9. The system of claim 1, wherein the transfer function is for a Butterworth filter or a Bessel filter.

10. The system of claim 1, wherein the coupling distances give a constant amplitude and flat group delay for the output optical signal within a desired bandwidth.

11. The system of claim 1, wherein the coupling coefficients multiplied by a bandwidth parameter results in a constant group delay between a maximum and minimum frequency that are functions of the bandwidth parameter.

12. The system of claim 1, wherein the plurality of resonators of the CROW are arranged in such a way as to compensate a group velocity dispersion due to different light propagating distances within the CROW as a function of a light frequency in such a way to obtain a constant group delay.

13. The system of claim 9, wherein the Bessel filter is an all-pass Bessel filter.

* * * * *